May 11, 1965
E. A. DUPUIS ETAL
3,183,345
ILLUMINATING AND GROUND-LIGHTING SYSTEM
Filed July 18, 1962
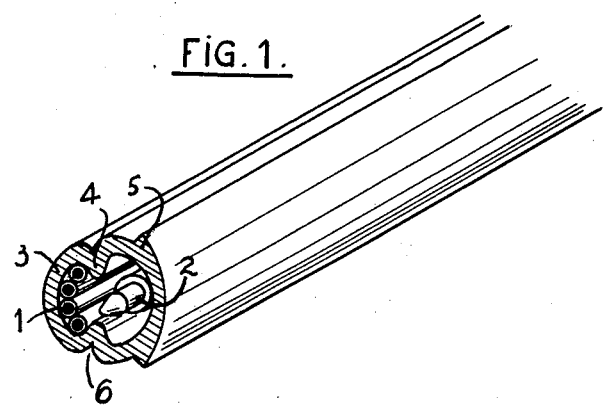
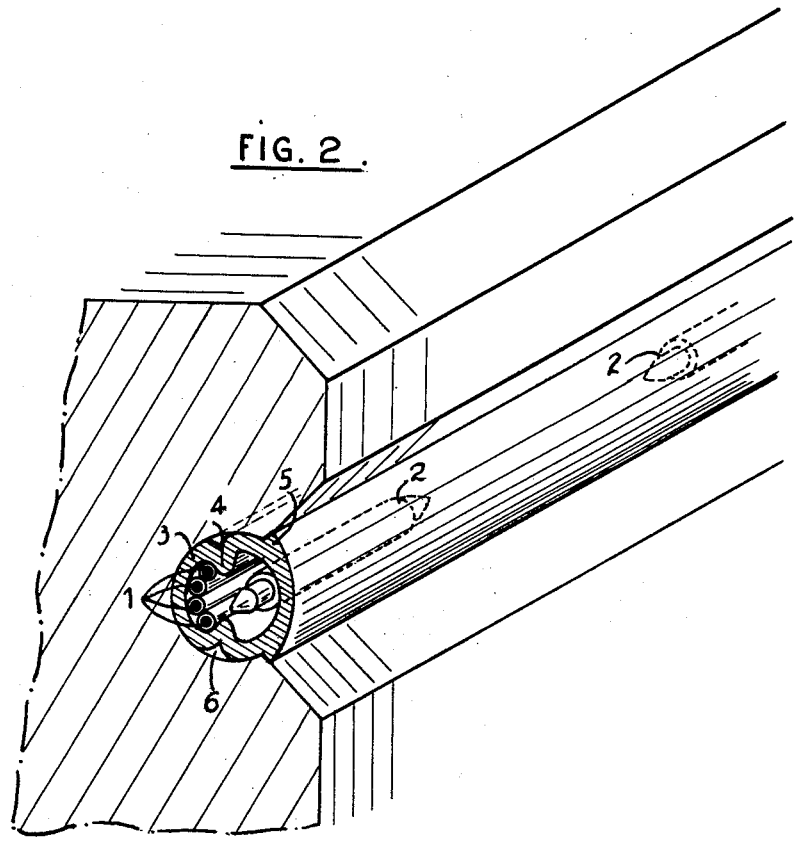

United States Patent Office 3,183,345
Patented May 11, 1965

3,183,345
ILLUMINATING AND GROUND-LIGHTING SYSTEM
Edouard Adolphe Dupuis and Edouard-Léon Dupuis, Ollignies, and José Dupuis, Ghislenghien, Belgium
Filed July 18, 1962, Ser. No. 210,765
Claims priority, application Belgium, Feb. 9, 1962, Patent 613,717
1 Claim. (Cl. 240—9)

This invention relates to illuminating and ground-lighting tubes adapted to be fitted in suitable supports such as buildings and road blocks to delineate traffic lanes and cross-roads and the like.

The invention concerns also the ground-lighting blocks themselves.

According to our invention, there is provided an illuminating and ground-lighting system including an elongated sheath of plastic material which is entirely or partly translucent or transparent and inside which are provided electric cables, said sheath being shaped so that it may serve as a luminous illuminating unit adapted to be fitted to a suitable support, while it is moreover specially designed so as to match, by reason of its sufficient flexibility, any incurved outline and to be housed reliably inside a groove provided along such an outline.

In order to allow our invention to be properly understood, we will now describe an embodiment thereof, reference being made to the accompanying drawings illustrating same. In said drawings:

FIG. 1 is a perspective view of a section of a sheath or tube according to our invention.

FIG. 2 illustrates the same sheath enclosed inside a grooved support.

In FIG. 1, 1 designates electric cables or leads connected with illuminating bulbs 2, said cables being fitted inside sheaths 3 made of a plastic material which is entirely or partly translucent or transparent.

Said sheaths 3 are provided with inner ribs 4 adapted to guide the leads, which latter may be distributed into a plurality of circuits, so as to produce different illuminating combinations.

The units thus obtained are adapted, in particular, to be positioned in supports or in ground-signalling blocks for traffic lanes, cross-roads and the like, which are provided with flutings or grooves extending throughout the length of the supports or blocks.

FIG. 2 shows such an application and as shown therein the portions of the sheath in contact with the divergent faces of the block for instance, are provided with reinforcing ribs 5 overlapping the edges of the divergent faces of the block, curb or the like.

In registry with each inner rib on the sheath, there is provided on said sheath an outer groove 6. The open spaces formed between the grooves 6 and the groove in the block or curb compensate for possible deformation of the sheath when the sheath is contacted by a vehicle tire or the like. Said grooves 6 also serve for the easy securing of the sheath in the block.

By reason of the outline disclosed hereinabove, the illuminating sheath housed inside the groove of a block or curb can be engaged only with difficulty by the tires of a vehicle and the force exerted by the latter is therefore comparatively reduced.

Furthermore, the electric system is held in an accurate position and may follow any twisting movement imparted to the sheath during the handling of the latter.

Consequently, the illuminating bulbs lie practically along the axis of the sheath and ensure thus a uniform illumination of the visible section of the sheath.

A further advantage associated with the presence of the reinforcement ribs 5 consists in that the illuminated area is made wider and that no bending may urge the sheath out of the groove in the curb.

What we claim is:

A marker unit comprising a block, said block being provided with a groove extending along the length of the block, said block having divergent faces extending outwardly from said groove, a resilient tube of synthetic plastic material located in said groove and having a visible exposed portion, at least the exposed portion of said tube being translucent, electric cables housed inside said tube and light sources connected to said cables and located in front of the cables and adjacent the visible exposed portion of the tube, the said block being adapted for being positioned relative to the road which is to be marked such that the exposed portion of said tube which is supported in said block is visible from said road, the tube including internal ribs opposite each other to support the cables within the tube, outer grooves provided in said tube in registry with said inner ribs, and external reinforcing ribs protruding on said tube and positioned so as to overlap the edges of the block, said ribs having inclined faces mating with the divergent faces of the block.

References Cited by the Examiner
UNITED STATES PATENTS 2,796,517 6/57 Herzfelder _____ 240—36 X
2,972,044 2/61 Smith _____ 240—9

FOREIGN PATENTS 1,239,261 7/60 France.

NORTON ANSHER, Primary Examiner.